United States Patent [19]

Nielsen, Jr.

[11] 4,407,146

[45] Oct. 4, 1983

[54] GAS METER LOCK ASSEMBLY

[75] Inventor: Anker J. Nielsen, Jr., Holden, Mass.

[73] Assignee: Omco, Inc., Holden, Mass.

[21] Appl. No.: 290,079

[22] Filed: Aug. 4, 1981

Related U.S. Application Data

[63] Continuation of Ser. No. 98,553, Nov. 29, 1979, abandoned.

[51] Int. Cl.³ ........................ F16B 41/00; F16L 55/00
[52] U.S. Cl. ......................................... 70/232; 70/18; 70/418; 285/80
[58] Field of Search ............... 285/80, 81; 70/18, 232, 70/231, 418, DIG. 57, 416, 417, 178, 177, 168, 164, 163, 158, 166; 137/382, 383; 292/307 B, 307 R

[56] References Cited

U.S. PATENT DOCUMENTS

| | | | |
|---|---|---|---|
| 619,795 | 2/1899 | Schreiner | 70/232 |
| 716,204 | 12/1902 | De Waldo | 70/232 |
| 1,119,904 | 12/1914 | Vissering | 285/81 X |
| 1,579,954 | 4/1926 | Sauton | 285/80 X |
| 1,690,461 | 11/1928 | Sieben | 70/418 X |
| 1,762,371 | 6/1930 | Wilhelm | 70/178 |
| 1,808,969 | 6/1931 | Porter | 292/307 B |
| 2,603,080 | 7/1952 | Earnhart | 70/232 |
| 3,540,468 | 11/1970 | Finck, Jr. | 70/178 X |
| 4,024,740 | 5/1977 | DiGiovanni | 70/DIG. 57 |
| 4,144,729 | 3/1979 | Nielsen, Jr. | 70/232 X |

FOREIGN PATENT DOCUMENTS

| | | | |
|---|---|---|---|
| 203243 | 8/1920 | Canada | 70/18 |
| 584555 | 10/1958 | Italy | 70/232 |
| 379123 | 8/1932 | United Kingdom | 292/307 R |
| 454672 | 10/1936 | United Kingdom | 70/416 |
| 854784 | 11/1960 | United Kingdom | 292/307 R |

Primary Examiner—Cornelius J. Husar
Assistant Examiner—Carl F. Pietruszka
Attorney, Agent, or Firm—Thompson, Birch, Gauthier & Samuels

[57] ABSTRACT

A lock assembly for preventing the unauthorized disconnection of a gas line where it is connected to the gas meter. The lock assembly has telescoping male and female shrouds, a bolt type lock and an end cap inserted transversely through the side walls of the telescoped shrouds to lock the two shrouds together to securely enclose the gas line threaded connection, and two turned back ears on the male shroud closed end which cover the female shroud open end side edges to prevent the female shroud and the male shroud from being pried apart by a pair of screwdrivers or the like.

10 Claims, 7 Drawing Figures (ABANDONED EXPERIMENT)

GAS METER LOCK ASSEMBLY

This application is a continuation, of application Ser. No. 98,553, filed 11/29/79 and now abandoned.

BACKGROUND OF THE INVENTION

This invention concerns preventing theft of gas by customers who seek to bypass the gas meters which utility companies provide to monitor gas usage by customers. In a typical installation, the gas utility company runs a gas line into a customer's residence or place of business. Within the customer's building, a gas meter is provided to measure and record the amount of gas which is drawn by the customer through the gas line. The gas meter is connected to the gas line by two exposed threaded fittings.

In the past, unscrupulous persons who wanted to steal gas would unscrew the two connection nuts by which the gas meter was inserted in the gas line. Then, the space between the two connection nuts would be bridged by the use of a bypass pipe. The gas would then be drawn by the customer appreciated that the construction as set forth and claimed in the instant application is unique and in no way anticipated by the art of record taken alone or in combination.

It is the purpose of this invention to provide an inexpensive, easy to use, lock assembly for use by utilities to prevent the unauthorized disconnection of at least one of the exposed connection nuts. By the use of this invention, it will become extremely difficult for a customer to bypass his gas meter without being easily detected by the meter reader.

Applicant experimented with a device like that shown in FIG. 5 of the drawings. This device proved unsatisfactory in use because it could be pried apart and opened with two screwdrivers. The FIG. 5 device roughly resembled the improved lock assembly shown in the remaining drawings of this application except that the FIG. 5 device had no ears extending from the bottom of the male shroud. Therefore, a thief could insert two screwdrivers between the male and female shrouds and then spread the shrouds apart. This exposed the lock assembly to attack and defeat by the thief. The present invention eliminates this fatal weakness of the prior art.

SUMMARY OF THE INVENTION

The locking assembly of the preferred embodiment is designed to enclose a threaded connection and to prevent a thief from gaining access to the connection. The locking assembly includes four components. A box-shaped male shroud covers one half of the connection. A mating horseshoe-shaped female shroud covers the other half of the connection and telescopes over the sides of the male shroud. Both shrouds have two aligned holes to receive a conventional bolt type lock and an internally grooved hollow end cap which cooperate to lock the two shrouds together. The lock can be opened only by a special security key.

It is intended that the locking assembly be locked over the gas meter intake threaded connection and remain locked on a substantially permanent basis. The locking assembly will protect the weakest spot in the illustrated arrangement.

DESCRIPTION OF THE PREFERRED EMBODIMENT

Figure 1:
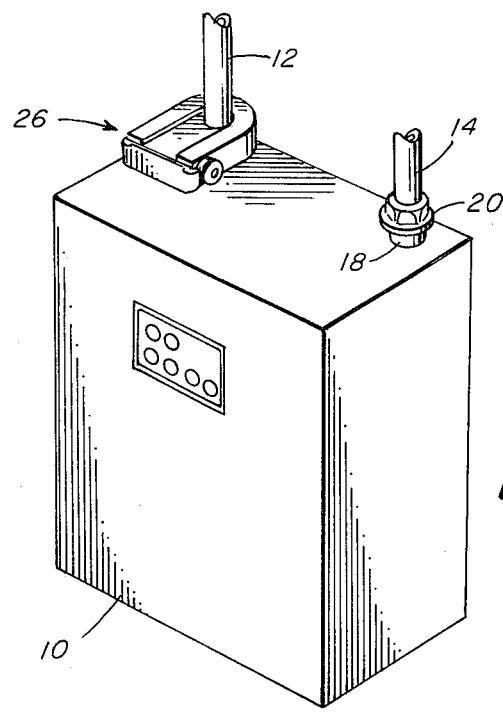
FIG. 1 is a perspective view of the preferred embodiment of the invention shown locked over the threaded connection between the incoming gas line and the gas meter intake pipe.

FIG. 1 shows how a conventional gas meter is arranged. A gas line 12 leads from outside the customer's building. The gas flows through line 12, through gas meter 10, and then through gas line 14 to the customer's gas appliances. The gas meter 10 has a short inlet pipe 16 and a short outlet pipe 18 which are coupled to gas lines 12 and 14, respectively. It will be seen that gas drawn into line 12 flows through inlet pipe 16, through meter 10, through outlet pipe 18, and out through line 14 to the customer's gas appliances. Lines 12 and 14 each carry an identical internally threaded connection nut 20 which is free to rotate about the line but which is retained on the line by a flange formed on the end of the line.

Connection nut 20 has a hexagonal or octagonal outer surface 22 adapted to be gripped and turned by a wrench. Connection nut 20 also has an internally threaded inner surface 24 adapted to threadably engage the externally threaded upper ends of inlet pipe 16 and outlet pipe 18. By the use of the two connection nuts 20, lines 12 and 14 can be connected to inlet pipe 16 and outlet pipe 18, respectively, to permit gas flow through gas meter 10.

In order to prevent a thief from bypassing gas meter 10 by uncoupling both connection nuts 20, and connecting the ends of lines 12 and 14, it is desirable to lock connection nut 20 in place on inlet pipe 16 or outlet pipe 18. To accomplish this, a locking assembly 26 is provided as shown in FIG. 1.

Locking assembly 26 includes a male shroud 28 which is preferably made of a heat treated case hardened 1010 steel approximately 1/16 inches thick. The male shroud is made of a single piece of metal which has been cut and bent to the box-like shape shown in FIG. 2. Male shroud 28 has a closed end 30, an open end 32, wide side walls 34, and narrow side walls 36. The closed end 30 is flat and solid and is perpendicular to the side walls which are perpendicular to each other. The open end 32 is shaped to fit around gas line 12, connection nut 20, and inlet pipe 16. The flat wide side walls 32 are provided with semi-circular cut-out portions 38 and 40. Upper cut-out portion 38 has a radius which approximates the radius of curvature of gas line 12. Lower cut-out portion 40 has a slightly larger radius which approximates the radius of curvature of inlet pipe 16. The flat narrow side walls 36 are both provided with rectangular notches 42 to accommodate the lower flanged portion of connection nut 20.

The male shroud 28 also has two bolt lock holes 44 formed through its narrow side walls 36. The bolt lock holes 44 are aligned parallel to closed end wall 30 and are adjacent to the end wall.

Figure 2:
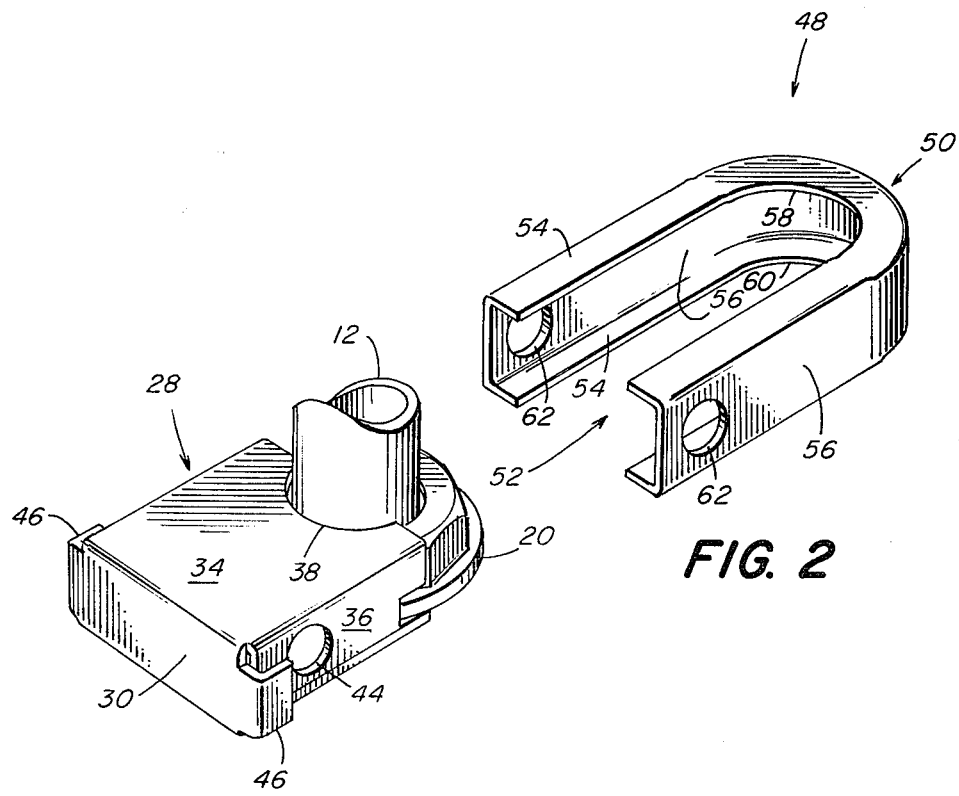
FIG. 2 is a disassembled perspective view of the male shroud shown in place around one half of the threaded connection nut, and the female shroud shown prior to telescopic assembly with the male shroud.

FIG. 2 shows how male shroud 28 is sized and shaped to fit around and enclose approximately one-half of connection nut 20 and to also fit closely around one-half of gas line 12 (above the connection nut) and one-half of inlet pipe 16 (below the connection nut). The two bolt lock holes 44 are not blocked by the semi-enclosed line 12, or connection nut 20, or pipe 16.

Male shroud 28 also has a pair of ears 46 which are integral with closed end 30 and which first extend directly away from each other in the plane of closed end 30 and then extend back towards the bolt lock holes 44, terminating just short of the holes. Preferably, ears 46 have a right angle shape and are spaced from narrow side walls 36 by a distance just slightly greater than the side wall thickness of the female shroud (to be described subsequently).

Locking assembly 26 also includes a female shroud 48 which is preferably made of the same material as male shroud 28. The female shroud is made of a single piece of metal which has been cut and bent to the horseshoe shape shown in FIG. 2. Female shroud 48 has a closed end 50, an open end 52, wide partial side walls 54, and narrow side walls 56. The closed end 50 is curved and solid and has a wall which is perpendicular to the wide partial side walls 54 which in turn are perpendicular to the narrow side walls 56. The open end 52 is sized and shaped to telescopically assemble over male shroud 28 and to fit around gas line 12, connection nut 20, and inlet pipe 16. The wide partial side walls 54 are provided with semi-circular cut-out portions 58 and 60. Upper cut-out portion 58 has a radius which approximates the radius of curvature of gas line 12. Lower cut-out portion 60 has a slightly larger radius which approximates the radius of curvature of inlet pipe 16. The narrow side walls 56 are spaced apart a distance slightly greater than the widest diameter of connection nut 20. The curved end wall of closed end 50 has a radius which is slightly greater than the radius of curvature of the flange on connection nut 20. Alternatively, closed end 50 could have a different shape, but regardless of its shape, it must be capable of enclosing gas line 12, connection nut 20, and inlet pipe 16.

The female shroud 48 also has two bolt lock holes 62 formed through its narrow side walls 56. The bolt lock holes are aligned parallel to the side wall leading edge surfaces forming open end 52 and are adjacent to open end 52.

Figure 4:
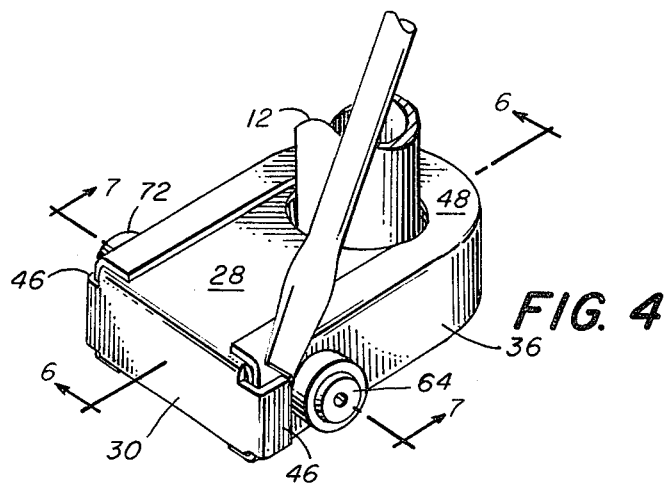
FIG. 4 is as perspective view of the invention shown assembled over the threaded connection and resisting a thief's insertion of a screwdriver blade.

FIG. 2 shows how female shroud 48 is sized and shaped to fit around and enclose approximately one-half of connection nut 20, and to also fit closely around one-half of gas line 12 (above the connection nut) and one-half of inlet pipe 16 (below the connection nut). The female shroud 48 is sized and shaped to telescopically assemble over the male shroud 28, as shown in FIG. 4, whereby the connection nut 20 is entirely enclosed and protected by the telescopically assembled shrouds. When assembled, the two female shroud bolt lock holes 62 are aligned with the two male shroud bolt lock holes 44, and the four aligned holes are not obstructed by line 12, connection nut 20, or pipe 16.

Figure 3:
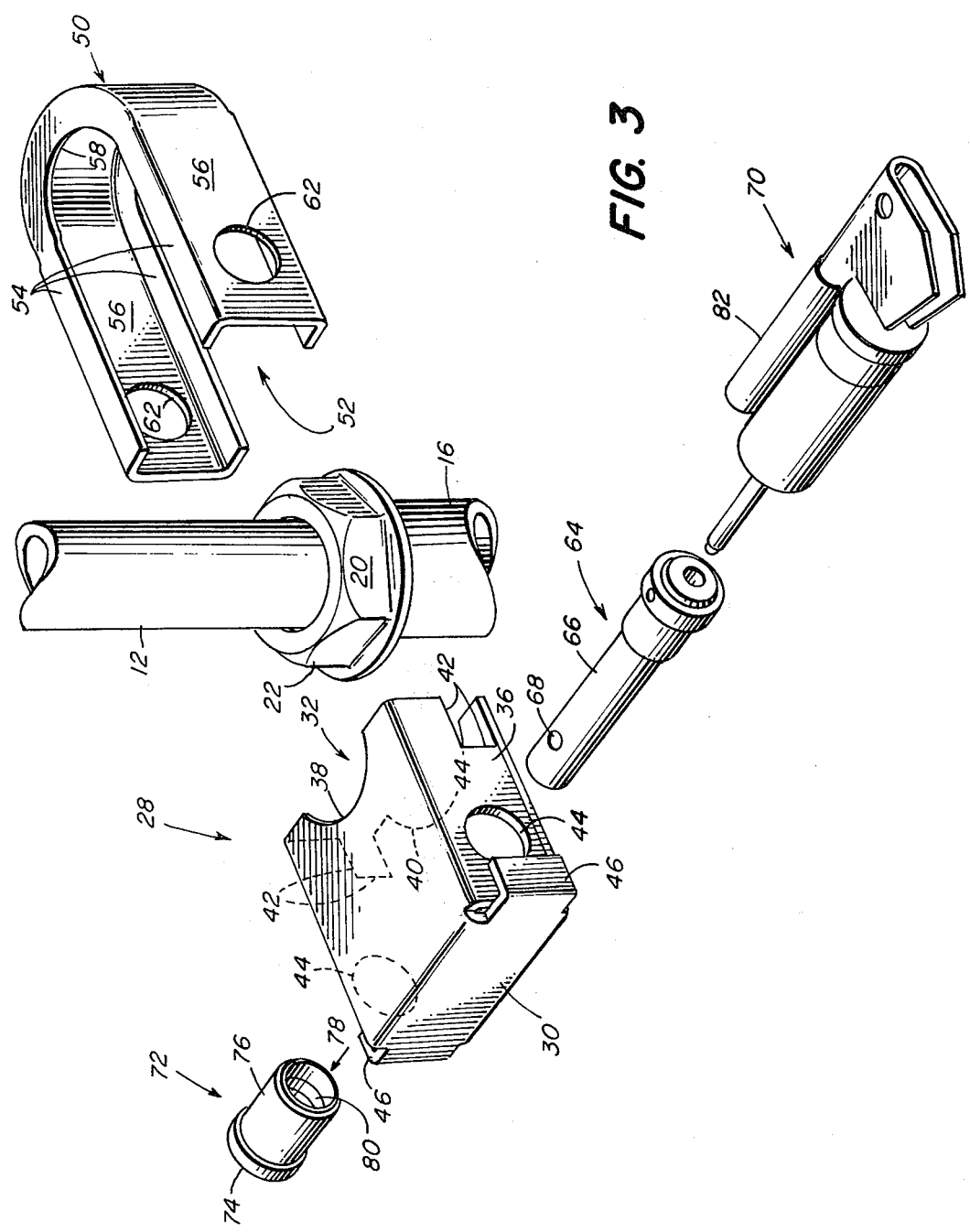
FIG. 3 is an exploded perspective view of all of the components of the invention.

After the male and female shrouds have been telescopically assembled as shown in FIG. 4, they are locked together by a conventional bolt type lock 64 which is inserted through one adjacent pair of aligned bolt lock holes. FIG. 3 shows a conventional bolt type lock similar to the locks described in U.S. Pat. Nos. 3,714,802; 3,835,674; or 3,968,985. Lock 64 has a barrel 66 and a pair of opposed locking balls 68 which can be extended beyond the barrel circumference or retracted beneath the barrel circumference by conventional security key 70.

Figure 7:
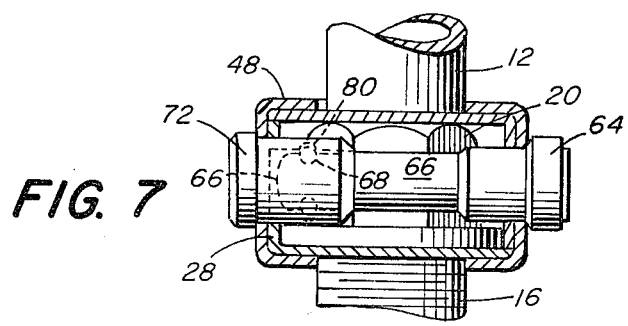
FIG. 7 is a sectional view of FIG. 4 taken along line 7—7.

A conventional end cap 72 is inserted through the other adjacent pair of aligned bolt lock holes. End cap 72 is cup-shaped with a closed end 74, cylindrical walls 76, an open end 78, and an internal annular locking ball retaining groove 80. The bolt type lock 64 extends towards and is inserted into the end cap, as shown in FIG. 7.

To lock the assembly, key 70 is inserted into lock 64 and key handle 82 is pivoted to release locking balls 68 so that they drop below the surface of lock barrel 66. Then, lock 64 is inserted into the end cap 72 and the key handle 82 is pivoted back to the position shown in FIG. 3 to force the locking balls 68 outwardly so that they engage and are lockably retained within annular groove 80 in end cap 72. The key is then removed and the assembly cannot be unlocked without the use of special security key 70. So long as the assembly is locked in this fashion, connection nut 20 is completely shielded from unauthorized access.

To unlock the assembly, key 70 is inserted into lock 64 and key handle 82 is pivoted in order to release locking balls 68. The lock can then be pulled out of the telescoped shrouds. After also removing end cap 72 from the shrouds, the shrouds can then be disassembled and removed entirely.

Figure 5:
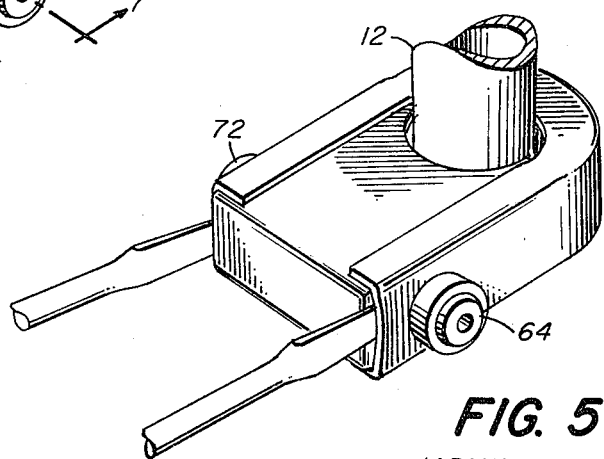
FIG. 5 is a perspective view of applicant's abandoned experimental device shown assembled over the threaded connection and being defeated by a thief's insertion and spreading of two screwdriver blades.
Figure 6:
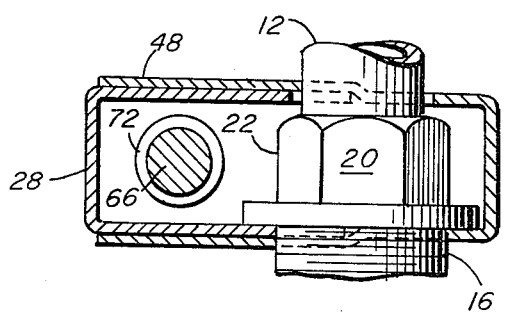
FIG. 6 is a sectional view of FIG. 4 taken along line 6—6.

FIG. 5 shows an experimental locking device which applicant recently abandoned when it became apparent that a thief could defeat it by inserting a pair of screwdrivers (or the like) between the shrouds and spreading them apart to expose the bolt type lock barrel and other vulnerable internal parts to attack. In order to solve this problem, applicant redesigned the male shroud 28 so that its closed end wall 30 had a pair of opposed ears 46, as shown in FIG. 4. Because of the size, shape and location of these protective ears 46, a thief is prevented from inserting screwdrivers (or the like) between the shrouds. Ears 46 preferably have a right angle shape, are spaced from the male shroud planar narrow side walls 36 by a distance which is just slightly greater than the thickness of the female shroud narrow side walls 56, and the ears are spaced from and parallel to the male shroud planar narrow side walls 36. The two ears tips extend to points where they are very close to the bolt type lock 64 and the end cap 72, respectively. Therefore, as can be seen in FIG. 4, a thief cannot wedge his screwdriver between the ears on the male shroud and the female shroud. Thus, the lock assembly is secure.

The foregoing description and drawings are intended solely to illustrate a preferred embodiment of this invention. There are many obvious modifications which could be made by one skilled in the art without departing from the spirit of this invention. Only the claims define and limit the scope of this invention.

I claim:

1. A reusable lock assembly adapted to prevent unauthorized disconnection of a gas line where the gas line is threadably connected to a gas meter, the gas line being conventionally connected by an internally threaded connection nut revolvably retained on the gas line, and the connection nut being threadably engaged to an externally threaded gas meter inlet pipe, the lock assembly comprising:

(a) a hollow male shroud having surfaces forming an open end and a closed end, said open end surfaces shaped to fit around and enclose approximately one-half of the internally threaded connection nut, said male shroud having two aligned transverse bolt lock holes formed therein adjacent to and substantially parallel to said closed end;

(b) a hollow female shroud having surfaces forming an open end and a closed end, said open end surfaces shaped to fit around and enclose approximately one-half of the internally threaded connection nut, said female shroud having two aligned transverse bolt lock holes formed therein adjacent to and substantially parallel to said open end, said female shroud being sized and shaped to be telescopically assembled over said male shroud and to be non-destructibly disassembled from said male shroud, the connection nut being substantially entirely enclosed by said assembled male and female shrouds, said four bolt lock holes being aligned when said shrouds are telescopically assembled;

(c) an end cap positioned in an adjacent pair of said bolt lock holes, said end cap opening within said telescoped shrouds and having an internal annular locking ball retaining groove;

(d) a bolt type lock positioned in the other adjacent pair of said bolt lock holes, said bolt type lock having locking balls which are adapted to be extended into said end cap retaining groove to become locked therein; and (e) said male shroud having a pair of ears extending from the extreme edges of said closed end, said ears extending out and away from each other and then back towards said bolt lock holes, said ears having leading edges, one of which is disposed closely adjacent to said bolt type lock, and the other one of which is disposed closely adjacent to said end cap;

(f) said female shroud and said male shroud being telescopically assembled in locked engagement when said bolt type lock and said end cap are received in said bolt lock holes and said bolt type lock is locked to said end cap, said female shroud and said male shroud being non-destructibly separable from one another when said bolt type lock and said end cap are unlocked from each other and are withdrawn from said bolt lock holes.

2. The lock assembly of claim 1 wherein said male shroud closed end is substantially flat and parallel to said four aligned bolt lock holes.

3. The lock assembly of claim 1 wherein said male shroud has planar side walls and a planar closed end, said closed end being perpendicular to said side walls.

4. The lock assembly of claim 3 wherein said two ears extend from the extreme side edges of said male shroud closed end out and back towards said female shroud bolt lock holes, said ears being spaced from and parallel to said male shroud planar side walls.

5. The lock assembly of claim 4 wherein each of said ears has a right angle shape.

6. The lock assembly of claim 5 wherein said ears are spaced from said male shroud planar side walls by a distance slightly greater than the thickness of the side walls of said female shroud.

7. In a reusable lock assembly adapted to prevent unauthorized disconnection of a gas line where the gas line is threadably connected to a gas meter, the gas line being conventionally connected by an internally threaded connection nut revolvably retained on the gas line, the connection nut being threadably engaged to an externally threaded gas meter inlet pipe, the lock assembly further including (a) a hollow male shroud having surfaces forming an open end and a closed end, the open end surfaces shaped to fit around and enclose approximately one-half of the internally threaded connection nut, the male shroud having two aligned transverse bolt lock holes formed therein adjacent to and substantially parallel to the closed end, (b) a hollow female shroud having surfaces forming an open end and a closed end, the open end surfaces shaped to fit around and enclose approximatey one-half of the internally threaded connection nut, the female shroud having two aligned transverse bolt lock holes formed therein adjacent to and substantially parallel to the open end, the female shroud being sized and shaped to telescopically assembled over the male shroud and to be non-destructibly disassembled from said male shroud, the connection nut being substantially entirely enclosed by the assembled male and female shrouds, the four bolt lock holes being aligned when the shrouds are telescopically assembled, (c) an end cap positioned in an adjacent pair of the bolt lock holes, the end cap opening within the telescoped shrouds and having an internal annular locking ball retaining groove, and (d) a bolt type lock positioned in the other adjacent pair of the bolt lock holes, the bolt type lock having locking balls which are adapted to be extended into the end cap retaining groove to become locked therein, the improvement therein comprising:

the male shroud having a pair of ears extending from the extreme edges of its closed end, said ears extending out and away from each other and then back towards the bolt lock holes, said ears having leading edges, one of which is disposed closely adjacent to the bolt type lock, and the other one of which is disposed closely adjacent to the end cap, said female shroud and said male shroud being telescopically assembled in locked engagement when said bolt type lock and end cap are received in said bolt lock holes and said bolt type lock is locked to said end cap, said female shroud and said male shroud being non-destructibly separable from one another when said bolt type lock and said end cap are unlocked from each other and are withdrawn from said bolt lock holes.

8. The lock assembly of claim 7 wherein said two ears extend from the extreme side edges of the male shroud closed end out and back towards the female shroud bolt lock holes, said ears being spaced from and parallel to the male shroud planar side walls.

9. The lock assembly of claim 8 wherein each of said ears has a right angle shape.

10. The lock assembly of claim 9 wherein said ears are spaced from the male shroud planar side walls by a distance slightly greater than the thickness of the side walls of the female shroud.

* * * * *

UNITED STATES PATENT AND TRADEMARK OFFICE
CERTIFICATE OF CORRECTION

PATENT NO. : 4,407,146
DATED : October 4, 1983
INVENTOR(S) : Anker J. Nielsen, Jr.

It is certified that error appears in the above-identified patent and that said Letters Patent are hereby corrected as shown below:

In column 6, line 27, before "telescopically", insert --be--

Signed and Sealed this

Seventh Day of February 1984

[SEAL]

Attest:

GERALD J. MOSSINGHOFF

Attesting Officer

Commissioner of Patents and Trademarks